United States Patent
Yearsley et al.

(10) Patent No.: US 8,675,868 B1
(45) Date of Patent: Mar. 18, 2014

(54) ENCRYPTING AN ADDRESS-DEPENDENT VALUE ALONG WITH CODE TO PREVENT EXECUTION OR USE OF MOVED CODE

(75) Inventors: Gyle D. Yearsley, Boise, ID (US); Joshua J. Nekl, Kuna, ID (US)

(73) Assignee: Maxim Integrated Products, Inc., San Jose, CA (US)

( * ) Notice: Subject to any disclaimer, the term of this patent is extended or adjusted under 35 U.S.C. 154(b) by 959 days.

(21) Appl. No.: 12/217,174

(22) Filed: Jul. 1, 2008

(51) Int. Cl.
*H04K 1/00* (2006.01)

(52) U.S. Cl.
USPC ............................................. 380/29; 713/193

(58) Field of Classification Search
USPC ............... 380/29, 28, 264; 713/187, 190, 193
See application file for complete search history.

(56) References Cited

U.S. PATENT DOCUMENTS

| | | | | |
|---|---|---|---|---|
| 4,142,233 A | * | 2/1979 | Suzuki | 365/222 |
| 4,315,310 A | * | 2/1982 | Bayliss et al. | 710/3 |
| 6,061,449 A | | 5/2000 | Candelore et al. | 380/28 |
| 6,336,585 B1 | | 1/2002 | Harada | 235/380 |
| 6,895,493 B2 | * | 5/2005 | Steiss et al. | 711/216 |
| 7,005,733 B2 | * | 2/2006 | Kommerling et al. | 257/679 |
| 7,958,376 B2 | * | 6/2011 | Glen | 713/193 |
| 2003/0137416 A1 | * | 7/2003 | Fu et al. | 340/568.1 |
| 2004/0107237 A1 | * | 6/2004 | Kashiwada | 709/200 |
| 2005/0076228 A1 | | 4/2005 | Davis et al. | 713/188 |
| 2006/0253708 A1 | * | 11/2006 | Bardouillet et al. | 713/176 |
| 2007/0061597 A1 | | 3/2007 | Holtzman et al. | 713/193 |
| 2008/0046680 A1 | * | 2/2008 | Nagata et al. | 711/207 |
| 2013/0238907 A1 | * | 9/2013 | Debout et al. | 713/193 |

* cited by examiner

*Primary Examiner* — Samson Lemma
(74) *Attorney, Agent, or Firm* — North Weber & Baugh LLP

(57) ABSTRACT

A memory is organized into blocks. In a write operation, data to be stored is combined with an address-dependent value (ADV) to form a block of information, and this block is encrypted. The block of encrypted information is written into a block of memory identified by the write address of the write operation. In a read operation, the block of encrypted information is read back from the memory and is decrypted to recover the data and the ADV. The address of the memory block from which the block of encrypted information was read is used to check the ADV to confirm that the ADV is related in the proper way to the address of the memory block that stored the encrypted information. If the check fails, the processor is prevented from executing the data, thereby preventing the processor from executing blocks of code that are in incorrect locations in memory.

21 Claims, 5 Drawing Sheets

ONE BLOCK OF THE ENCRYPTION ALGORITHM
"FUNDAMENTAL BLOCK SIZE"

EXTERNAL MEMORY WRITE
OPERATION

ENCRYPTING AN ADDRESS-DEPENDENT VALUE ALONG WITH CODE TO PREVENT EXECUTION OR USE OF MOVED CODE

TECHNICAL FIELD

The described embodiments relate to secure processors and to anti-tamper techniques.

BACKGROUND INFORMATION

Purchases are often made using an electronic device called a Point Of Sale (POS) terminal. The POS terminal is typically coupled to a financial institution via an electronic communication link. A customer in a store may, for example, present a debit card, credit card, cash card or smart card to the store's cashier for payment. Consider an example of a transaction with a smart card. The customer presents the smart card to the cashier of the store. The cashier pushes the smart card into a smart card reader port on the POS terminal and the POS terminal reads an account number stored in the smart card. The customer then, for identification purposes, typically enters a Personal Identification Number (PIN) into a keypad device coupled to the POS terminal. The customer may also enter other identification information. The customer may, for example, provide a signature on a signature capture device coupled to the POS terminal.

The POS terminal then uses an encryption key stored in the POS terminal to encrypt the account number (from the smart card), the identification number (for example, the PIN number), and other information about the transaction such as the amount of the transaction and the date of the transaction. The encrypted information is sent from the POS terminal to the financial institution via a modem or other electronic communication link.

The financial institution receives the encrypted information and uses an encryption key to decrypt the information and recover the account number, identification information, and information about the transaction. In the case where the transaction is a debit transaction, the bank account of the customer is debited. A confirmation of the transaction is then encrypted using the encryption key and the encrypted confirmation is communicated from the financial institution back to the POS terminal. The POS terminal uses the encryption key stored in the POS terminal to decrypt the confirmation. Typically, the confirmation is printed out as part of a transaction receipt and a copy of the receipt is provided to the customer.

Accordingly, it is seen that sensitive financial and identification information is entered into and passes through the POS terminal. Encryption keys are typically stored in the POS terminal so that the POS terminal can communicate with the financial institution in a secure manner. Moreover, as the POS terminal is used, information about customers is stored in and/or passes through the POS terminal. Such information may include bank account and credit card numbers of customers and their associated PIN numbers. If, for example, a thief were to learn of the bank account number of a customer and the account's associated PIN number, then the thief may be able to use the information to steal money from the customer and/or to make unauthorized purchases by masquerading as the customer. It is therefore important for POS terminals to have security features that prevent thieves from obtaining this sensitive information from POS terminals. Various techniques and circuits have been employed to prevent such security breaches. Unfortunately, rings of thieves are now using ever more sophisticated and advanced electronics techniques to foil the security measures built into POS terminals. Techniques for making POS terminals more secure are desired.

SUMMARY

A memory is organized into blocks. In a novel block-aligned write operation, data to be stored is combined with an address-dependent value (ADV) to form a block of information, and this block is encrypted. The data may, for example, include program code and/or data values. The block of encrypted information is written into a block of memory identified by the write address of the write operation. In one example, the write address identifies a byte within the memory block that is to be written with data. In one example, and ADV points to the first byte of the memory block. The ADV and the write address are related in that they both point to or identify the same block of memory.

In a novel block-aligned read operation, the block of encrypted information can be read back from the memory. A novel memory controller reads back the block of encrypted information from the memory and decrypts the information to recover the data and the ADV. The read address that was used to identify the memory block from which the block of encrypted information was read is then used to check the ADV to verify that the ADV is related to the read address in the proper way.

If the ADV verification check passes, then the memory controller supplies the data to a processor that initiated the read operation. In one example, the data includes instructions that the processor then executes. If the ADV verification check fails, on the other hand, then the memory controller alerts the processor to the error condition and the data is not supplied to the processor. Due to being alerted to the error condition, the processor does not execute instructions in the data, thereby preventing the processor from executing blocks of instructions that are read from incorrect locations in memory.

Preventing a hacker from causing the processor to execute or use portions of code (instructions and/or data) that have been moved in memory by the hacker helps to prevent certain types of security attacks. The novel block-aligned read operation, the novel block-aligned write operation, and the novel memory controller therefore see use in secure processor applications including Point Of Sale (POS) terminals.

Further details and embodiments and techniques are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Figure 1:
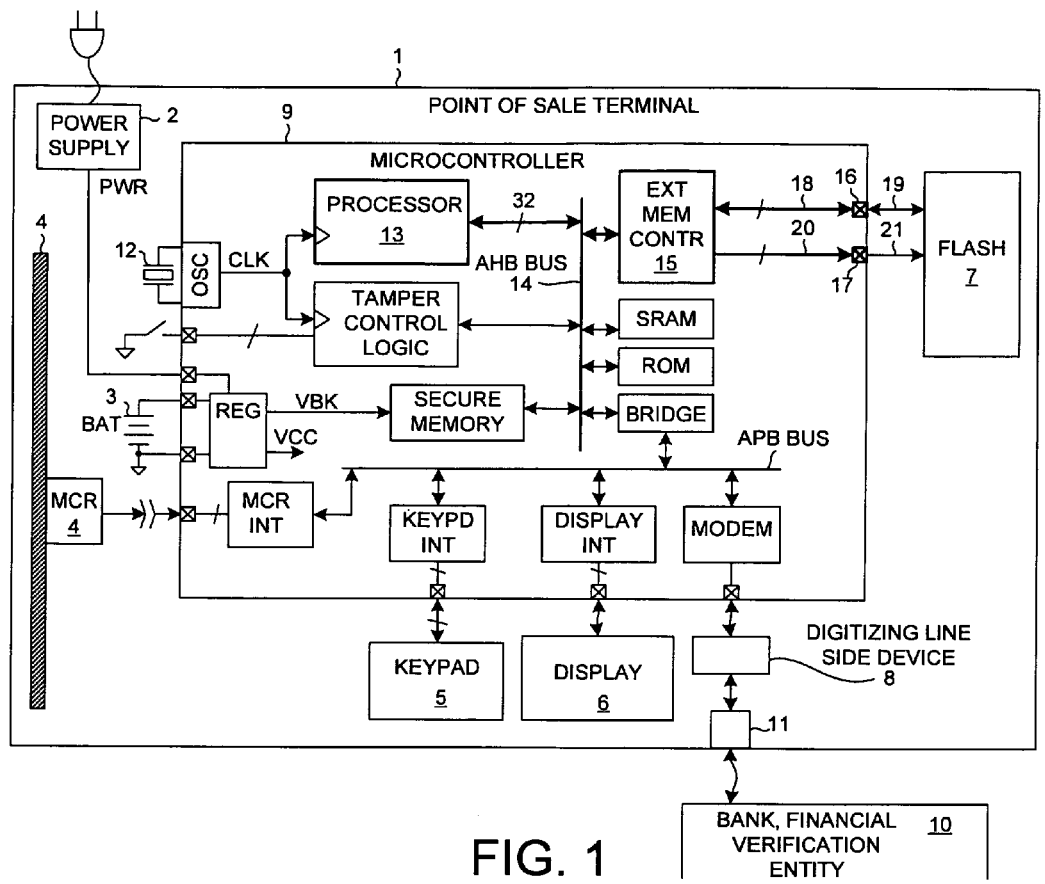
FIG. 1 is a simplified block diagram of one example of a POS terminal 1 in accordance with one novel aspect.

FIG. 1 is a simplified block diagram of one example of a POS terminal 1 in accordance with one novel aspect. POS terminal 1 includes a power supply 2, a crystal 12, a battery 3, a magnetic card reader (MCR) assembly 4, a keypad 5, a display 6, a non-volatile memory (for example, FLASH) 7, a line side device 8, and a novel microcontroller integrated circuit 9. Novel microcontroller integrated circuit 9 can communicate with a bank or other financial institution or financial verification entity 10 via line side device 8 and modem port 11. A customer can swipe a credit card through MCR assembly 4 such that the MCR assembly and microcontroller read information encoded in magnetic stripes on the credit card. A person can interact and enter PIN numbers and credit card numbers and other information into POS terminal 1 via keypad 5. POS terminal 1 can also display information to a customer or merchant or other person via display 6. For additional information on such a POS terminal and its structure and operation, see U.S. Pat. No. 7,343,496, by Hsiang et al. (the entire subject matter of which is incorporated herein by reference).

Microcontroller integrated circuit 9 includes, among other parts, a processor 13, a local bus 14, and a novel external memory controller 15. Processor 13, in this example, is an ARM9 processor as specified by ARM Limited, of Cambridge, England. Bus 14 is, in this example, an Advanced High-Performance Bus (AHB) bus as defined in the "Advanced Microcontroller Bus Architecture (AMBA) Specification", published by ARM Limited, Cambridge, England. Memory controller 15 interfaces to external FLASH memory device 7 via a plurality of terminals 16 and 17. Lines 18 and 19 represent a plurality of data conductors through which memory controller 15 can read information from FLASH 7 in read cycles and can write information to FLASH 7 in write cycles. Lines 20 and 21 represent address conductors that memory controller 15 uses to supply physical addresses to FLASH 7 in such read and write cycles. For simplification purposes in the illustration only one set of data conductors and one data terminal are pictured for data and one set of address conductors and one address terminal are pictured for address. The data conductors and data terminal, however, represent multiple such data conductors. Similarly, the address conductors and address terminals represent multiple such address conductors. Also, although not pictured, the memory controller to FLASH memory interface includes other signals such as, for example, chip select signals and associated terminals.

In the particular example illustrated, the interface is a static memory interface for interacting with a static and asynchronous memory device such as FLASH device 7, but in another example the interface is configured to be a dynamic memory interface for interacting with a dynamic memory device such as an SDRAM. In the present example, FLASH 7 is a one megabyte deep by 16-bit wide asynchronous FLASH memory device.

Figure 2:
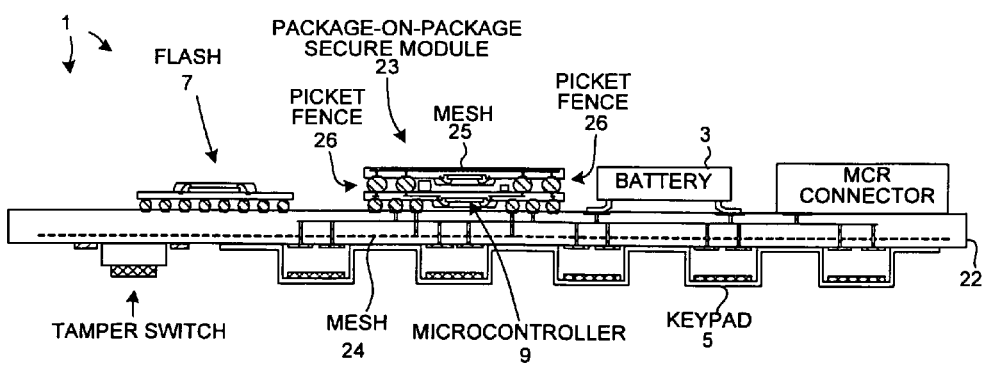
FIG. 2 is a cross-sectional diagram that illustrates the structure of the POS terminal 1 of FIG. 1.

FIG. 2 is a simplified cross-sectional diagram that is illustrative of the structure of POS terminal 1. The electronic components of POS terminal 1 are mounted to a printed circuit board 22. Novel microcontroller integrated circuit 9 is part of a package-on-package (POP) secure module 23 that is mounted to printed circuit board 22 as illustrated. An anti-tamper security mesh substantially surrounds microcontroller 9. This anti-tamper security mesh involves a mesh of conductors 24 in printed circuit board 22, a mesh of conductors 25 in the upper substrate of POP module 23, and a picket fence mesh structure 26 involving peripheral bond balls of POP module 23. FLASH integrated circuit 7 is disposed outside this anti-tamper security mesh as pictured.

Figure 3:
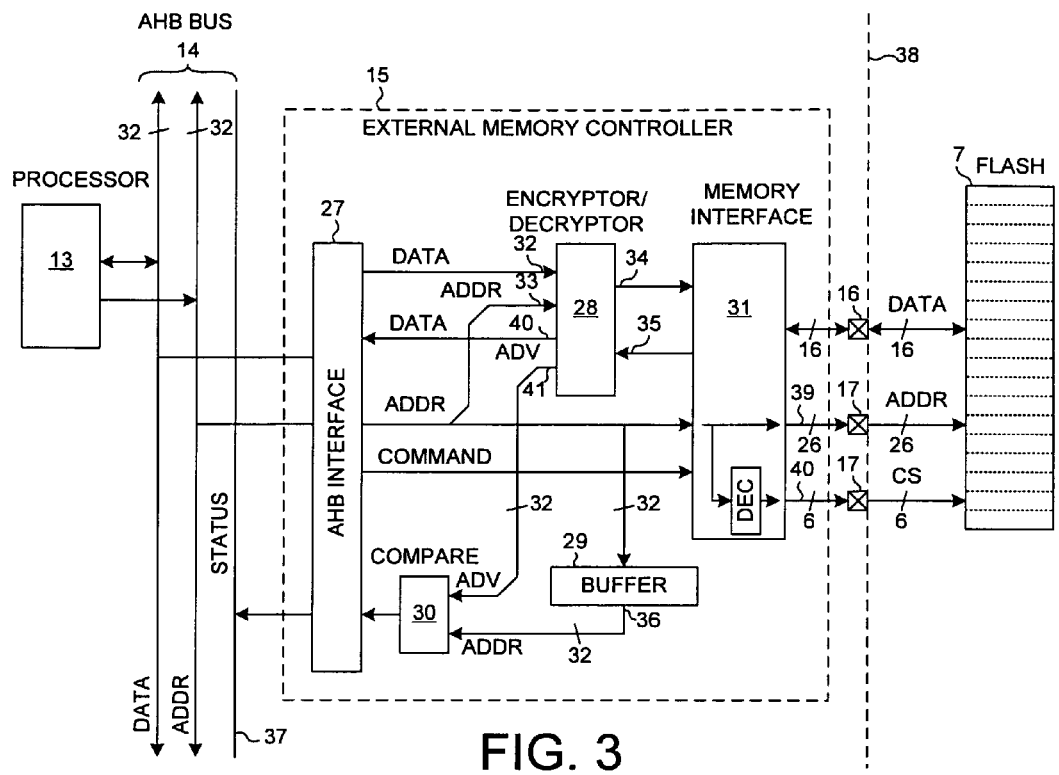
FIG. 3 is a more detailed block diagram of the novel memory controller 15 of POS terminal 1 of FIG. 1.

FIG. 3 is a more detailed diagram of novel memory controller 15. Memory controller 15 includes an AHB bus interface circuit 27, an encryptor/decryptor 28, a buffer 29, a compare circuit 30, and a memory interface circuit 31. In the present example, encryptor/decryptor 28 is a dedicated hardware state machine that does not execute instructions. Encryptor/decryptor 28 can receive a 128-bit block of information via input leads 32 and 33 and can use a 128-bit cryptographic key to encrypt the block. Encryptor/decryptor 28 then outputs a resulting 128-bit block of encrypted information via output leads 34. Encryptor/decryptor 28 can also receive a 128-bit block of encrypted information via input leads 35, can use a 128-bit cryptographic key to decrypt the block, and can output a resulting 128-bit block of decrypted information via output leads 40 and 41. Encryptor/decryptor 28 applies the well-known and accepted symmetric encryption/decryption algorithm known as AES (Advanced Encryption Standard). The AES algorithm is described in the US NIST Federal Information Processing Standard (FIPS), Publication FIPS-197, Nov. 26, 2001. The individual blocks illustrated in the block 7 labeled "FLASH" in FIG. 3 represent individual 128-bit blocks of FLASH memory. As set forth above, this particular FLASH memory 7 is organized to have 16-bit wide words. Eight consecutive 16-bit memory locations therefore together form one 128-bit block. In the example being described here, each block in FLASH 7 contains information that is encrypted using the AES algorithm. Dashed line 38 represents a boundary of microcontroller integrated circuit 9.

Figure 4:
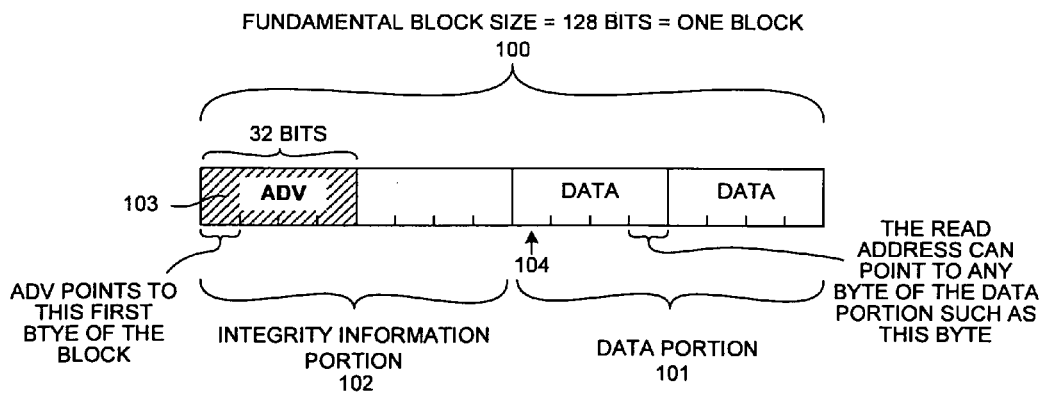
FIG. 4 is a diagram of one block of information in unencrypted form.

FIG. 4 is a diagram that illustrates one 128-bit block 100 of information, before it has been encrypted. Block 100 includes a data portion 101 and an integrity information portion 102. In one novel aspect, integrity information portion 102 includes an address-dependent value (ADV) portion 103. The remaining portion of integrity information portion 102 in this case is a fixed and known constant such as a zero value.

In one example of a block-aligned read operation, processor 13 issues an AHB bus read request onto AHB bus 14 and to memory controller 15. This AHB bus read request is to read an amount of data that is located in FLASH 7 starting at an 8-bit byte identified by a 32-bit read address. The 32-bit read address that identifies the location of this 8-bit byte in FLASH 7 is supplied by processor 13 to memory controller 15 on the ADDR bus conductors of AHB bus 14. The amount of data requested can be eight bits, sixteen bits, thirty-two bits, sixty-four bits or a larger amount. If the amount of data requested is more than the amount of data in one block, then memory controller 15 automatically reads enough memory blocks to retrieve the amount of requested data. Because for each sixty-four bits of data stored in FLASH 7 there is an equal sixty-four bit amount of integrity information, memory controller 15 multiplies the address by two to obtain a read address. The read address is stored in buffer 29 so that it is available on output leads 36 of buffer 29. The memory interface circuit 31 of memory controller 15 then reads the 128-bit block of encrypted information from FLASH that includes the requested byte or bytes of data. If, for example, 64-bits are requested to be read, and if the starting read address points to 8-bit byte 104, then memory interface 31 automatically reads eight consecutive 16-bit memory locations in eight read cycles. Memory controller 15 automatically handles block alignment such that the entire memory block that contains the data identified by the read address is read from FLASH 7, even if the data requested is only a part of the data portion of a block.

FLASH 7 actually in this example involves six memory integrated circuits. Memory interface circuit 31 performs the eight read cycles by outputting a 26-bit address on address lines 39 and by outputting chip select signals on six chip select lines 40. The physical address supplied to FLASH 7 is incremented from read cycle to read cycle so that the eight consecutive 16-bit locations of the appropriate memory block are read. The resulting 128-bit block of information that is read from FLASH 7 is presented to encryptor/decryptor block 28, and is decrypted using the AES algorithm. The result is a 128-bit block of unencyrpted information that has the format illustrated in FIG. 4. The upper 32-bits contain an address-dependent value (ADV) that has a value that has a known relationship to the 32-bit read address received from processor 13. In the present example, this 32-bit ADV is identical to the 32-bit read address except that the lower four bits of the ADV are zero. The ADV is an address that points to the first 8-bit byte of the memory block that contained the 8-bit byte pointed to by the 32-bit read address from processor 13. The ADV value is compared by compare circuit 30 to the read address stored in buffer 29. If the upper twenty-eight bits of the ADV value match the upper twenty-eight bits of the read address, then the 128-bit block that was read from FLASH 7 is verified to have been read from the proper memory block in FLASH. Upon verification, the sixty-four bit data portion 101 of the unencrypted information passes through AHB interface 27 and back to processor 13 via AHB bus 14. If, however, the upper twenty-eight bits of the ADV value do not match the upper twenty-eight bits of the read address, then the 128-bit block that was read from FLASH 7 fails the verification check. AHB interface 27 supplies an AHB bus error back to processor 13 via status conductors 37 of AHB bus 14 in accordance with the AHB protocol. In response to this error status, processor 13 vectors off to a handler routine and does not execute instructions in the data read from FLASH 7.

Because the starting byte address of each 128-bit block of information in FLASH 7 is stored in encrypted form in the block itself, a hacker cannot move a 128-bit block of encrypted information from one block location to another block location in FLASH 7 and expect the processor to read the moved block without detecting a tamper condition. Without knowing how to decrypt and encrypt a block of information, the hacker is unable to alter a moved block of code to contain the proper ADV for the new location of the block.

Figure 5:
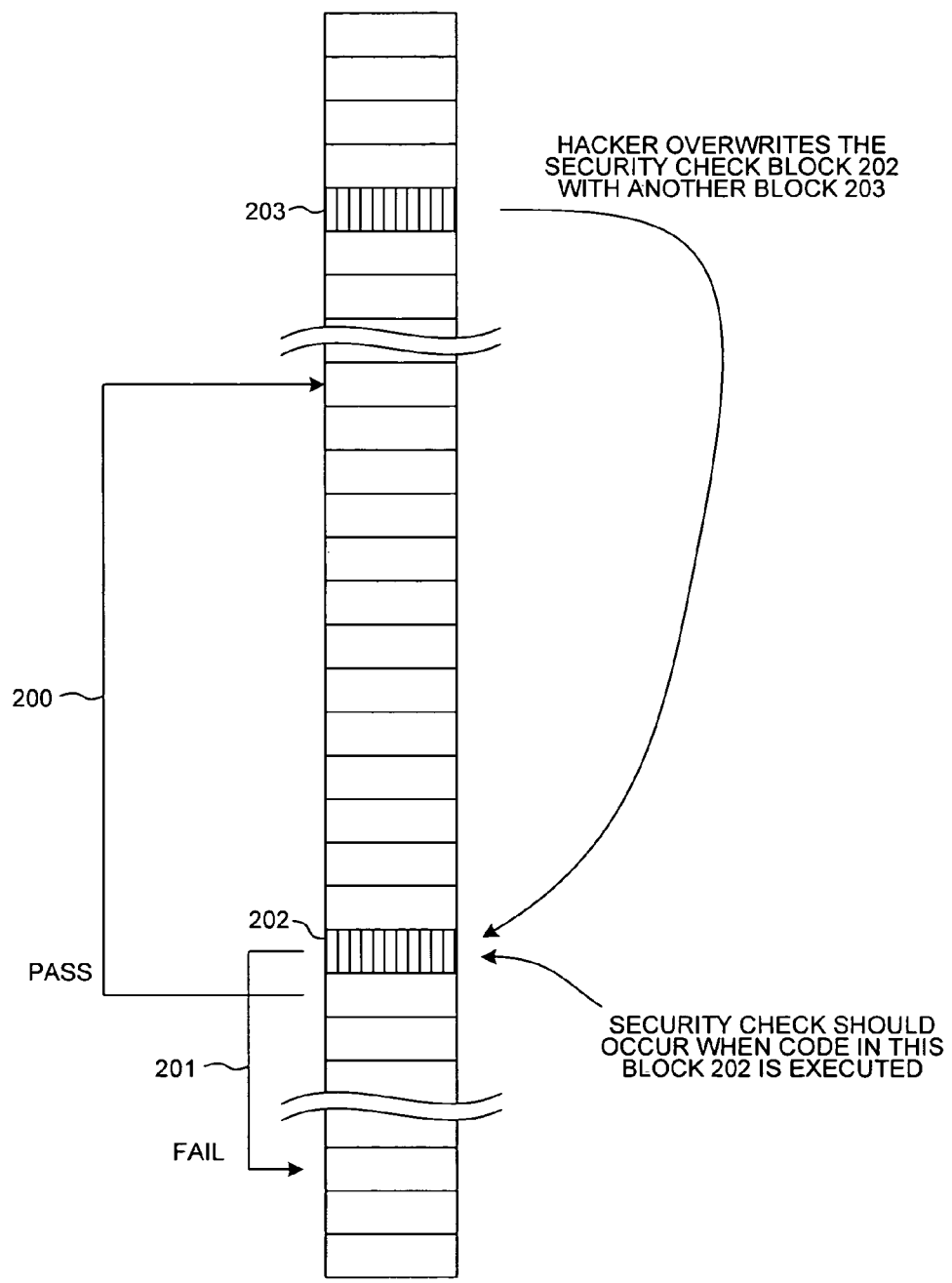
FIG. 5 is a diagram that illustrates a shortcoming of a conventional POS terminal.

FIG. 5 is a diagram that illustrates a potential security weakness in some conventional POS terminals. The blocks that are shown in FIG. 5 in a vertical column represent consecutively addressed and stored blocks of encrypted information. Each block may contain program code and/or data in encrypted form. In the example of FIG. 5, a conventional POS terminal processor is executing a program that is resident in an external memory in the form of the blocks of encrypted information. As the processor executes, the processor reads blocks from the external memory, decrypts the blocks to obtain program code, and executes decrypted program code. Execution of the program causes a security check to be performed periodically. An example of such a security check is a check of the anti-tamper security mesh. If the security check does not fail, then execution of the program loops back and continues to cause other POS terminal functions to be performed. Arrow 200 represents this loop back. Other POS terminal functions may, for example, include the processing and accessing of sensitive financial information. If, however, the security check fails, then execution of the program is to jump to an error routine. Arrow 201 represents this jump. The error routine may, for example, cause encryption keys and other sensitive information to be erased from the POS terminal before a thief can read the information out of the POS terminal circuitry.

In the security attack illustrated in FIG. 5, it is assumed that the thief is unable to decrypt blocks of code stored in the external memory because the thief does not know the encryption and decryption keys. The thief is, however, able to use sophisticated code behavior analysis techniques such as Differential Power Analysis (DPA) to determine the block 202 of the program where the security check is likely being performed. Assume for purposes of this example that the thief correctly guesses that the processorperforms the security check as a consequence of executing code stored in block 202. The thief can then overwrite block 202 of encrypted information with another block 203 of encrypted information. The thief may not know what execution of the code of block 203 will cause processor 13 to do. When the processor decrypts the substituted block 203, execution of the moved code may cause the POS system to fail or may cause the POS system to detect a tamper condition. The thief may, however, repeatedly try substituting other blocks for the original block 202 until the substitution appears to allow the main program loop to continue operating. In this situation, the conventional secure processor reads the substituted block of information and decrypts it and executes the resulting code, rather than executing the proper code that would have caused the security check to have been performed. The security check is therefore effectively disabled even though the thief was unable to decrypt the block of memory or to write and encrypt blocks of memory. Once the security check is disabled, the thief can remove the security mesh and continue to attempt to extract sensitive information stored in the POS terminal without the tamper condition being detected.

In the novel POS terminal 1 of FIGS. 1-4, however, the attack outlined in FIG. 5 will fail and the moved block of code 203 will not be executed. The thief may be able to overwrite original block 202, but when memory controller 15 reads the substituted block 203 it will decrypt the block and recover the ADV value. The ADV value will not, however, point to the start of the memory block in FLASH from which the substituted block was read. The verification check will fail, the data portion of the block will not be returned to processor 13, and processor 13 will not execute or use the moved code. Rather, processor 13 will be alerted to the security breach by an AHB bus error on status lines 37 as explained above.

Figure 6:
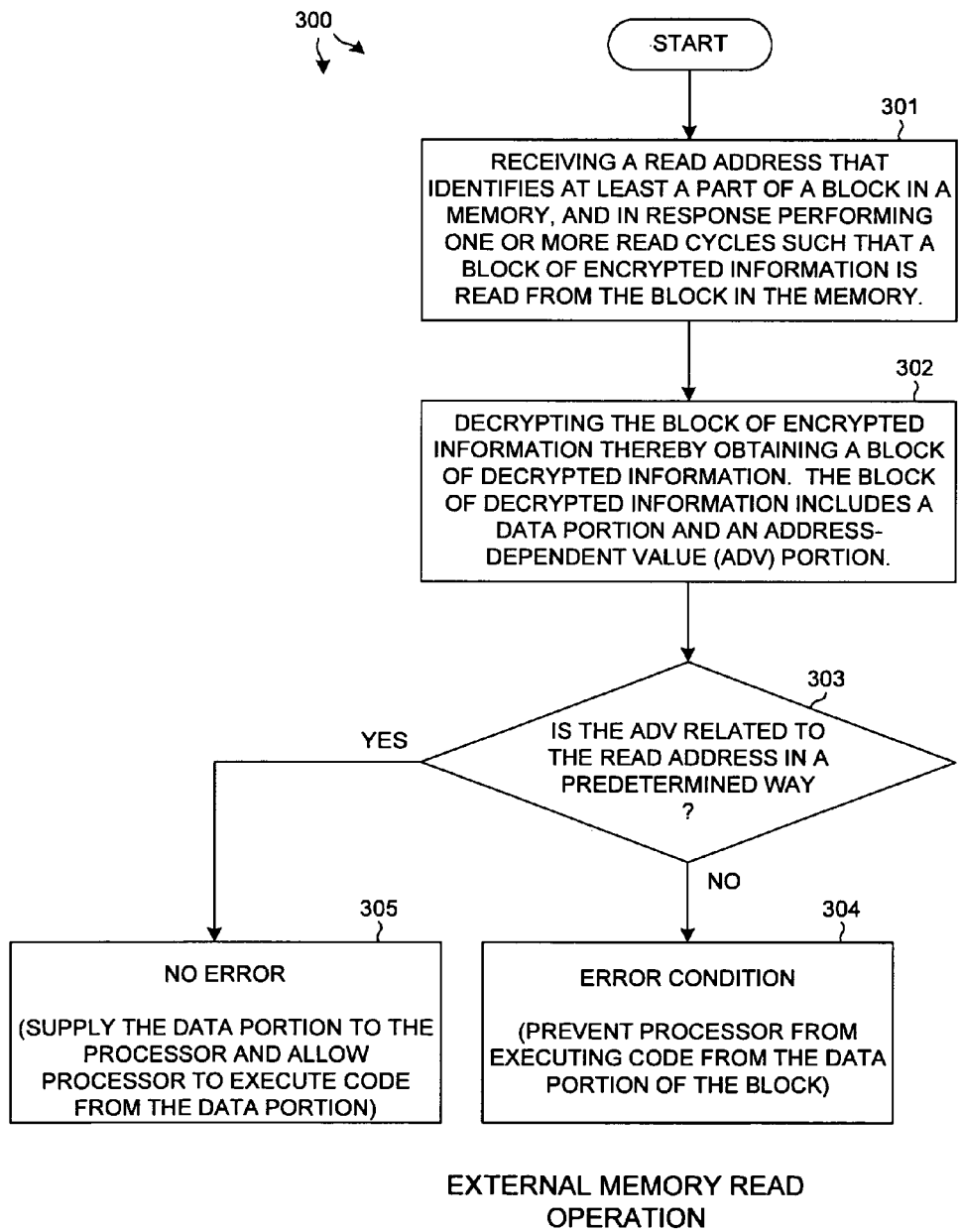
FIG. 6 is a flowchart of a method of reading a block of encrypted information from a memory. The block of encrypted information, when decrypted, includes a data portion and an address-dependent value (ADV) portion.

FIG. 6 is a simplified flowchart of a novel method 300. In a first step (step 301), a read address is received where the read address identifies at least a part of a block in a memory. In response to this receiving of the read address, one or more read cycles are performed such that a block of encrypted information is read from the block in the memory. In one example, the read address is the physical address of an 8-bit portion of a 64-bit data portion of the block. The memory controller 15 automatically performs eight read cycles to read eight consecutive 16-bit words from FLASH 7. These eight read cycles read the 128-bit block that contains the 8-bit byte addressed by the read address, regardless of which 8-bit byte of the data portion the read address identifies.

Next (step 302), the block of encrypted information is decrypted, thereby generating a block of unencrypted information. The unencrypted information includes an address-dependent value (ADV) portion, and a data portion. In one example, the block of unencrypted information is as pictured in FIG. 4.

Next (step 303), the read address is used to perform a verification check to confirm that the ADV recovered from the block is related to the read address in a predetermined way. In one example, the verification check is a confirmation that upper portion of the ADR (all ADV bits but for the bottom four bits) match the upper portion of the read address (all read address bits but for the bottom four bits).

If the verification check fails, then (step 304) the processor is prevented from executing code from the data portion. In one example, an error condition is reported to processor 13 via the status conductors 37 of AHB bus 14. If, however, the verification check passes, then (step 305) the data portion of the decrypted block of information is supplied to the processor and the processor is allowed to execute or otherwise use code from the data portion of the block.

Figure 7:
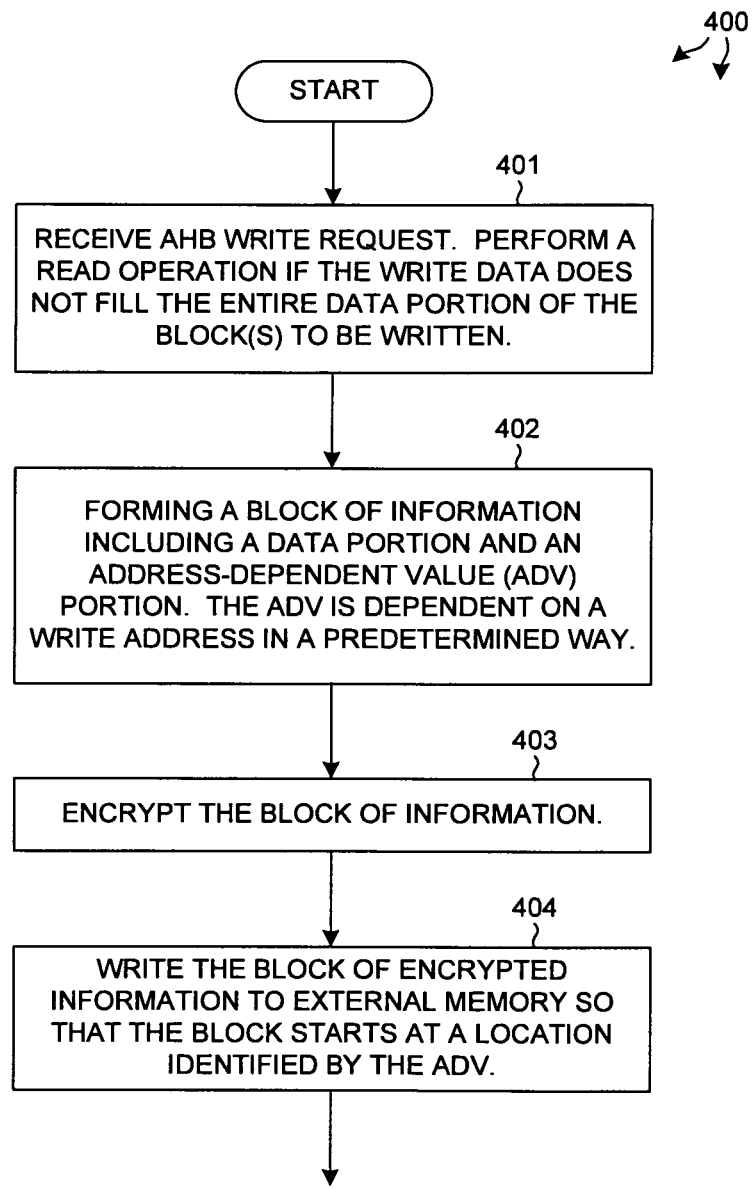
FIG. 7 is a flowchart of a method of writing a block of encrypted information to a memory. The block of encrypted information, when decrypted, includes a data portion and an address-dependent value (ADV) portion.

In addition to performing the above-described ADV verification check on memory reads, novel memory controller 15 also can write 128-bit blocks of encrypted information into FLASH 7 where each such block includes an encrypted ADV. FIG. 7 is a simplified flowchart of a novel method 400 involving such a block-aligned write operation. In a first step (step 401), memory controller 15 receives an AHB block-aligned write request to write an amount to data starting at a write address. If the amount of data to be written is less than the amount in the data portion of the memory block, then memory controller 15 automatically first performs a block-aligned read operation to obtain the data portion.

Next, memory controller 15 forms a block of information (step 402) including a data portion and an address-dependent value (ADV) portion. If the amount of data requested to be written in the AHB write request is less than the amount in the data portion of the memory block, then the data request to be written is overlaid over the data read back from the block in the block-aligned read operation. If, on the other hand, the amount of data requested to be written is the entire 64-bits of the data portion, then the block-aligned read operation is not performed and no overlay is required. The data to be written is simply the data portion.

The ADV of the formed block of information is dependent on a write address in a predetermined way. The most significant bits of the ADV (all ADV bits but for the four least significant bits) match the most significant bits of the write address (all write address bits but for the four least significant bits). The write address can identify any one of the 8-bit bytes in the data portion of the block. The ADV identifies the first 8-bit byte of the block.

Next (step 403), the block of information is encrypted. In one example, encryptor/decryptor 28 performs this encryption.

Next (step 404), the block of encrypted information is written to external memory starting at the ADV address. In one example, the 128-bit block of encrypted information is written into eight consecutive 16-bit memory locations in eight memory write cycles. The first 8-bit byte of the block of encrypted information is written into a byte of FLASH pointed to by the ADV. After the 128-bit block of encrypted information has been written into FLASH 7, the block can be read back using the read process flow described above in connection with FIG. 6. In the read back operation, memory controller 15 performs the ADV verification check to confirm that the ADV of the read back block has the correct ADV for the physical address of the block in FLASH that stored the block of information. The automated mechanism for reading and writing encrypted blocks into external memory in a secure fashion allows stacks to be maintained in the external memory. Write operations are used to push values onto a stack, and read operations are used to pop values off the stack.

There is one bit in memory controller 15 for each of the six chip select output terminals. Processor 13 can set and reset each of these bits. If a bit is set and a write to a memory block associated with the corresponding chip select results in a block-aligned read operation, and if this block-aligned read operation fails due to an ADV verification fail, then the subsequent block-aligned write operation is not performed and processor 13 is alerted to the failure. If, on the other hand, the bit is not set and the write to the memory block associated with the corresponding chip select results in a block-aligned read operation, and if this block-aligned read operation fails due to an ADV verification fail, then the subsequent block-aligned write operation is performed and no error condition is reported to processor 13. By resetting certain of these bits, stacks can be maintained in portions of external memory such as external RAM without having to set up the memory space beforehand with proper ADV values.

Although not explained in the simplified explanation above, memory controller 15 also includes configuration registers that are writable by processor 13 across AHB bus 14. By writing appropriate configuration information into these registers, processor 13 can cause the encryption/decryption described above to be used in a portion of external memory space and can cause ordinary unencrypted data to be read from and written into another portion of external memory space. The external memory in which the encrypted blocks are stored need not be a FLASH memory and need not be organized to include 16-bit memory locations. A 16-bit wide FLASH memory 7 is explained above only as an example. In one example, memory controller 15 is a versatile memory controller than can be configured by processor 13 to interface to multiple different types of memory devices that can be coupled to interface terminals 16. In addition to interfacing to memory devices, memory controller 15 can be configured to interface to input/output devices that have serial interfaces similar to synchronous memories. In one example, memory controller 15 is realized by describing the function and structure of the various portions 27-31 of memory controller 15 in a hardware description language such as Verilog. A hardware synthesis program is then used to convert the Verilog functional description into a hardware circuit design.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:
1. A method comprising:
(a) storing an address-dependent value (ADV) indicative of integrity associated with an amount of program code stored in a block of a memory, the ADV and the amount of program code being stored in encrypted form, the ADV being independent from the amount of program code, a plurality of the most significant bits of the ADV being generated and distinct from a write address that identifies a byte in the block according to a predetermined way;
(b) using a read address in one or more read cycles to read information from the block of the memory;

(c) decrypting the information read from the block and thereby obtaining the ADV and the amount of program code; and (d) determining whether the ADV and the read address are related according to the predetermined way.

2. The method of claim 1, wherein the decrypting of (c) involves a decryption algorithm that has a fundamental block size, and wherein the information read in (b) is of the fundamental block size.

3. A method comprising:
(a) receiving a read address that identifies at least a part of a block in a memory, and in response to the receiving performing one or more read cycles such that a block of encrypted information is read from the block in the memory;
(b) decrypting the block of encrypted information and thereby obtaining a block of decrypted information, wherein the block of decrypted information includes a data portion and an address-dependent value (ADV) portion indicative of integrity associated with an amount of program code stored in the block of the memory, the ADV being independent from the amount of program code a plurality of the most significant bits of the ADV being generated and distinct from a write address that identifies a byte in the block according to a predetermined way; and
(c) using the read address to perform a verification check to confirm that the ADV has a predetermined value, wherein the predetermined value is a function of the read address.

4. The method of claim 3, wherein the ADV is an address. of a beginning portion of the block in the memory, and wherein the read address is an address that identifies another portion of the block.

5. The method of claim 3, wherein (a) involves generating a chip select signal, and wherein the chip select signal and a portion of the read address are supplied to the memory in the one or more read cycles.

6. The method of claim 3, further comprising:
(d} supplying the data value from a memory controller to a processor if the ADV passes the verification check in (c), whereas if the ADV fails the verification check in (c) then communicating an error condition to the processor, wherein, (a), (b), (c) and (d) are performed at least in part by the memory controller.

7. The method of claim 3, wherein multiple read cycles are performed in (a), wherein each of the multiple read cycles reads a memory word from the memory, and wherein the memory words of the multiple read cycles together form the encrypted block.

8. The method of claim 7, wherein the decrypting of (b) involves a decryption algorithm that has a fundamental block size, and wherein the encrypted block in (a) is of the fundamental block size.

9. The method of claim 3, further comprising:
(d) receiving a write address and a second data value;
(e) encrypting a second block of information, wherein the second block of. Information includes the second data value and a second ADV, wherein the encrypting of the second block of information results in a second block of encrypted information; and
(f) in response to (d) performing one or more write cycles such that the second block of encrypted information is written to the memory, wherein the second ADV has a value that is a function of the write address.

10. The method of claim 3, wherein (a), (b) and (c) are performed by a memory controller within a point of sale terminal, wherein a security mesh substantially surrounds the memory controller, wherein the memory is a part of the point of sale terminal but wherein the memory is outside the security mesh.

11. A method comprising:
providing a plurality of blocks of encrypted information in a memory, wherein the information of each block includes a corresponding address-dependent value (ADV) indicative of integrity associated with an amount of program code stored in the block of the memory, the corresponding ADV being independent from an amount of program code stored with the corresponding ADV in each block, a plurality of the most significant bits of the corresponding ADV being generated and distinct from a write address that identifies a byte in the block according to a predetermined way.

12. The method of claim 11, further comprising:
encrypting each of the plurality of blocks using an encryption algorithm, the encryption algorithm having a fundamental block size, wherein each block is of the fundamental block size.

13. An integrated circuit comprising:
a memory controller adapted to receive a read address and in response to the receiving to perform one or more read cycles, wherein the one or more read cycles result in a read of a block of encrypted information into the memory controller, the memory controller comprising:
a decryptor that decrypts the block of encrypted information and thereby obtains a data value and an address-dependent value (ADV) indicative of integrity associated with the data value, the ADV being independent from the data value, a plurality of the most significant bits of the ADV being generated and distinct from a plurality of the most significant bits of a write address that identifies a byte in the block according to a predetermined way; and
a verification circuit that uses the read address to perform a verification check on the ADV.

14. The integrated circuit of claim 13, wherein the memory controller further comprises:
a bus interface, wherein a result of the verification check is reported onto a bus via the bus interface.

15. The integrated circuit of claim 14, wherein the memory controller further comprises:
a bus interface that supplies the data value onto a bus if the verification check verifies the ADV.

16. The integrated circuit of claim 14, wherein the verification check involves determining whether a portion of the ADV is equal to a portion of the read address.

17. The integrated circuit of claim 14, wherein the verification check involves determining whether the ADV is dependent upon the read address according to the predetermined way.

18. The integrated circuit of claim 14, wherein the memory controller further comprises:
a memory interface that performs said one or more read cycles and thereby reads multiple consecutive words from a memory, wherein the multiple consecutive words together form the block of encrypted information.

19. An apparatus comprising:
a plurality of memory interface terminals; and
means for
(1) receiving a read address and in response performing one or more read cycles such that a block of encrypted information is read into the apparatus through the plurality of memory interface terminals, (2) decrypting the block of encrypted information and thereby obtaining a data value and an address-dependent value (ADV) indicative of integrity associated with the data value, the ADV being independent from the amount of program code stored with the ADV in the block, a plurality of the most significant bits of the ADV being generated and distinct from a write address that identifies a byte in the block according to a predetermined way, (3) verifying that the ADV is related to the read address in a predetermined way, and (4) supplying the data value onto a bus internal to the apparatus if the ADV is verified to be related to the read address in the predetermined way.

20. The apparatus of claim 19, wherein the means is an integrated circuit, wherein the decrypting involves a decryption algorithm that has a fundamental block size, and wherein the block of encrypted information is of the fundamental block size.

21. The apparatus of claim 20, wherein the means is also for forming a second block of information including a second data value and a second ADV, the second ADV being related to a write address according to the predetermined way, for encrypting the second block of information and thereby forming a second block of encrypted information, and for performing one or more write cycles such that the second block of encrypted information is written from the apparatus' through the plurality of memory interface terminals.

\* \* \* \* \*